United States Patent [19]

Hoshino

[11] Patent Number: 5,745,204
[45] Date of Patent: Apr. 28, 1998

[54] LIQUID CRYSTAL COLOR DISPLAY DEVICE

[75] Inventor: Toshiaki Hoshino, Fukushima-ken, Japan

[73] Assignee: Alps Electric Co., Ltd., Tokyo, Japan

[21] Appl. No.: 560,240

[22] Filed: Nov. 21, 1995

[30] Foreign Application Priority Data

Nov. 29, 1994 [JP] Japan ................................ 6-294927

[51] Int. Cl.$^6$ ............................................. G02F 1/1335
[52] U.S. Cl. ............................................................. 349/117
[58] Field of Search ................................... 349/117, 119, 349/118

[56] References Cited

U.S. PATENT DOCUMENTS

| | | | |
|---|---|---|---|
| 4,936,654 | 6/1990 | Suzaki et al. | 349/117 |
| 5,056,896 | 10/1991 | Limura et al. | 349/118 |
| 5,212,819 | 5/1993 | Wada | 349/117 |
| 5,287,207 | 2/1994 | Mulkens et al. | 349/117 |
| 5,497,256 | 3/1996 | Aoyama et al. | 349/117 |

FOREIGN PATENT DOCUMENTS 3-2827  9/1991  Japan .

*Primary Examiner*—William L. Sikes
*Assistant Examiner*—James A. Dudek
*Attorney, Agent, or Firm*—Guy W. Shoup

[57] ABSTRACT

A liquid crystal color display device comprises a liquid crystal cell 3 having a liquid crystal layer with an angle of twist being within a range of 180° to 270° and a pair of electrode substrates intervening the liquid crystal layer therebetween, a twist phase plate 4 serving as a birefringent layer, and a pair of polarizers 2, 5. The value of Δn·d of the phase plate 4, wherein Δn represents a refractive index anisotropy and d represents a thickness, and that of the liquid crystal layer in voltage-free condition are substantially at the same level within a range of 1.4 to 2.0 μm. The value of Δn·d of the liquid crystal layer can be continuously changed by appropriately controlling a voltage applied thereto. By this, colorization of the device is possible.

5 Claims, 4 Drawing Sheets

FIG. 3

| Δnd(LC) [μm] / Δnd(PH) [μm] | 1.3 | 1.4 | 1.5 | 1.6 | 1.7 | 1.8 | 1.9 | 2.0 |
|---|---|---|---|---|---|---|---|---|
| 1.2 | ○ | × | × | × | × | × | × | × |
| 1.3 | ○ | ○ | × | × | × | × | × | × |
| 1.4 | ○ | ○ | ○ | × | × | × | × | × |
| 1.5 | × | ○ | ○ | ○ | × | × | × | × |
| 1.6 | × | ○ | ○ | ○ | ○ | × | × | × |
| 1.7 | × | ○ | ○ | ○ | ○ | ○ | × | × |
| 1.8 | × | × | ○ | ○ | ○ | ○ | ○ | × |
| 1.9 | × | × | × | ○ | ○ | ○ | ○ | ○ |
| 2.0 | × | × | × | × | ○ | ○ | ○ | ○ |

○ : WHITE (FOR ALL OF THE RGB)
× : ONE OR TWO COLORS AMONG RGB

LIQUID CRYSTAL COLOR DISPLAY DEVICE

BACKGROUND OF THE INVENTION

1. Field of the Invention

This invention relates to a liquid crystal color display device of the super-twisted nematic type (hereinafter referred to simply as STN-type) which has the capability of multi-color display and more particularly, to a liquid crystal color display device which is applicable as a high-duty display device with a greater number of scanning lines.

2. Description of the Prior Art

As is known in the art, the STN-type liquid crystal display devices have a liquid crystal layer wherein the angle of twist of liquid crystal molecules in the liquid crystal layer is so great as, for example, not less than 180°. Accordingly, a slight variation in voltage permits an abrupt change in light transmittance. This is why they have been widely adopted as a display device in various fields such as of word processors and personal computers. In these fields, the quantity of display information is great, and high density and high quality images are required. In recent years, liquid crystal color display devices are now being widespread wherein a desired color can be appropriately selected as a display color. For this purpose, color filers are attached to the respective electrode substrates at the stage of manufacturing the STN-type liquid crystal display device.

More particularly, in the fabrication of the electrode substrate of a liquid crystal cell, a transparent electrode such as ITO is patterned on a transparent substrate such as glass. A plurality of transparent electrodes to which a potential can be individually applied is taken as one pixel, under which if R (red), G (green) and B (blue) color filters (filter layers) are individually superposed on the plural transparent electrodes and a potential is applied to an appropriately selected transparent electrode or electrodes, the display colors of the respective pixels can be individually changed as desired.

It should be noted that in order to obtain such color filters, a very fine pattern has to be formed after precise registration. Such a fine pattern is difficult to form by an ordinary screen printing technique. In practice, for example, a known photolithographic process is repeated thereby forming color filters.

However, a number of steps are necessary for the fabrication of color filters since fine patterns have to be made for individual colors of R, G and B. Additionally, the fabrication is so complicated that high precision registration has to be repeated. Hence, it was difficult to make such color filters inexpensively. Especially, as the display plane of liquid crystal display devices has now been larger in area, high-duty performance of the device wherein the scanning lines increase in number is now promoted. This, in turn, requires more precise registration at the time of formation of color filters. For instance, when the colorization of a high-duty STN-type liquid crystal device having, for example, a duty ratio of 1/240 is realized using color filters, there arises the problem in that a considerable rise in production cost is inevitable.

Known liquid crystal color display devices attached with color filters are disadvantageous in that they cannot stand use owing to the shortage of light quantity for the following reason. Since the contrast is enhanced by the provision of color filters capable of absorbing transmitted light except for light of a specific wavelength and also by a light-interrupting black mask attached to about individual color filters, the color display device does not work satisfactorily if fabricated as a reflection-type display device which is free of built-in back light (light source).

SUMMARY OF THE INVENTION

It is accordingly an object of the invention to provide an inexpensive liquid crystal color display device wherein the rise in production cost as will be caused by colorization is suppressed to a minimum and which can be used as a reflection type which has not any built-in light source.

It is another object of the invention to provide an inexpensive liquid crystal color display device which is applicable for high-duty purpose.

The above objects can be achieved, according to the invention, by a liquid crystal color display device which comprises: a liquid crystal cell including a pair of electrode substrates, each subjected to aligning treatment on the surface thereof, and a nematic liquid crystal layer which is provided between the pair of electrode substrates and which has a positive dielectric anisotropy and an angle of twist set at 180° to 270°; a birefringent layer provided in face-to-face relation with the liquid crystal cell and capable of bringing about a birefringent effect on transmitted light; and a pair of polarizers sandwiching the liquid crystal cell and the birefringent layer therebetween, wherein the birefringent layer and the liquid crystal layer in voltage-free condition have, respectively, values of $\Delta n \cdot d$, wherein $\Delta n$ represents a refractive index anisotropy and d represents a thickness, the values being substantially at the same level within a range of 1.4 to 2.0 µm, and wherein the value of $\Delta n \cdot d$ of the liquid crystal cell is continuously varied by controlling a voltage applied thereto.

The STN-type liquid crystal device has a liquid crystal layer which brings about a birefringent effect on transmitted light. Hence, when white light linearly polarized at a rear polarizer is passed through the liquid crystal layer, a dispersion of wavelength takes place wherein elliptically polarized light rays whose directions of the major axis differ from one another depending on the wavelength are synthesized. Based on this, when a voltage applied across the liquid crystal layer is gradually changed to change the value of $\Delta n \cdot d$ of the liquid crystal layer, different transmittance curves are obtained depending on the wavelengths of R (red), G (green) and B (blue) colors.

As defined above, on the condition that the value of $\Delta n \cdot d$ of the liquid crystal layer in voltage-free condition is set at a level not higher than 2.0 µm, a birefringent layer whose value of $\Delta n \cdot d$ is substantially equal to that of the liquid crystal layer is provided between the liquid crystal cell and a front polarizer. By this, the birefringent effect of the liquid crystal layer in voltage-free condition is substantially offset by the provision of the birefringent layer, so that the light transmitted through the liquid crystal layer can be returned to a color close to that of incident white light. In this condition, if the voltage applied across the liquid crystal layer is properly controlled to continuously change the value of $\Delta n \cdot d$ of the liquid crystal layer, a display color can be changed, as desired, in response to the transmittance levels of R, G and B. Thus, colorization based on the control of the voltage can be realized.

As defined hereinabove, the value of $\Delta n \cdot d$ of the liquid crystal layer in voltage-free condition where no voltage is applied is set at a level not less than 1.4 µm. Hence, even if an effective voltage applied to the liquid crystal layer is reduced for high-duty purposes, the value of $\Delta n \cdot d$ of the liquid crystal layer in voltage-applied condition can be appreciably changed, thus ensuring good quality color development while preventing degradation of contrast.

BRIEF DESCRIPTION OF THE DRAWINGS

FIG. 3 is a table showing the results of judgment on "yes" or "no" of display colors obtained by changing the value of $\Delta n \cdot d$ of a liquid crystal layer in voltage-free condition and the value of $\Delta n \cdot d$ of a twist phase plate in an arrangement of the first embodiment;

PREFERRED EMBODIMENTS OF THE INVENTION

Embodiments of the invention are described with reference to the accompanying drawings.

Figure 1:
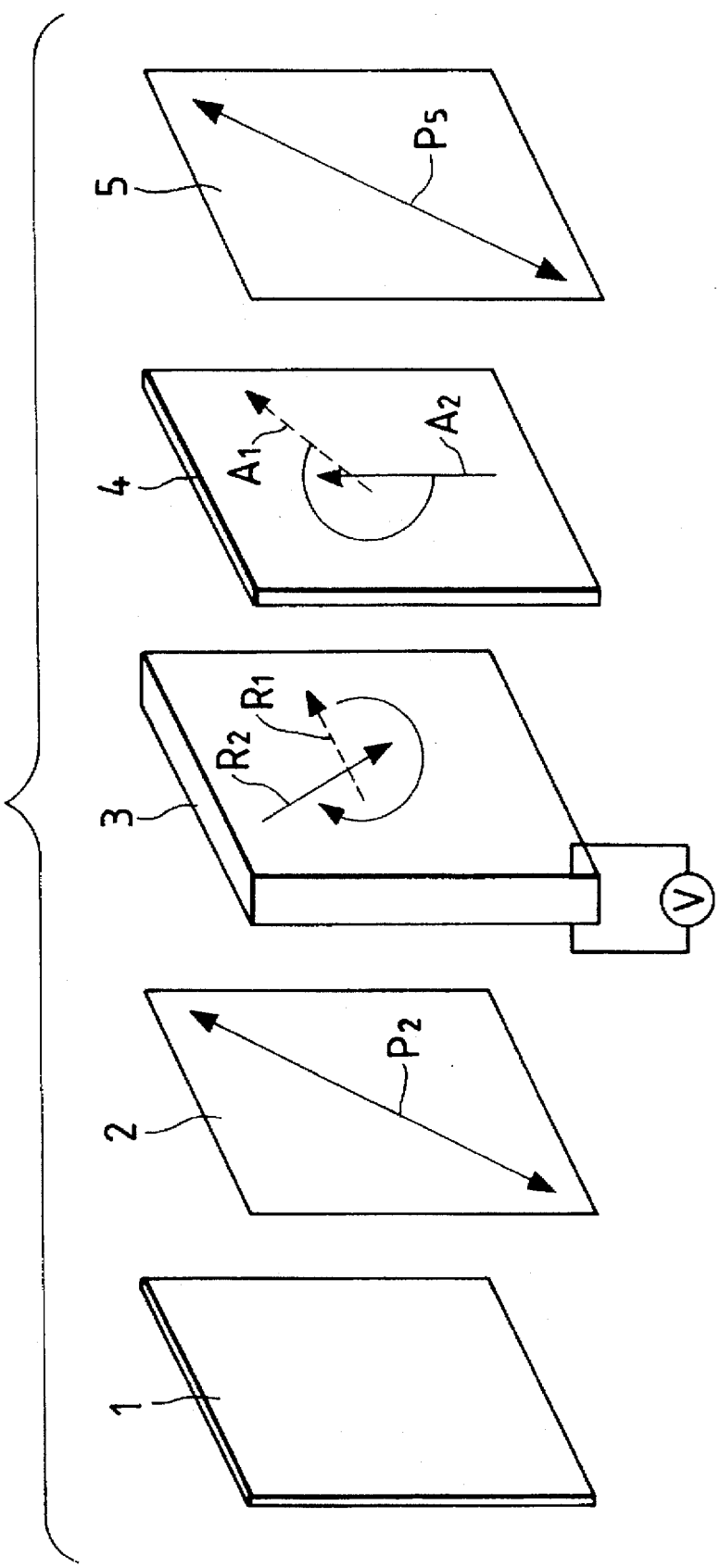
FIG. 1 is a schematic, exploded view of a liquid crystal color display device according to one embodiment of the invention.

Reference is now made to FIG. 1 which is a schematic, exploded view showing the respective elements of a liquid crystal color display of the type which has not built-in back light (light source). The device includes a reflection plate 1, a rear polarizer or polarizing plate 2, a liquid crystal cell 3, a twist phase plate 4 and a front polarizer 5 as shown. The liquid crystal cell 3 includes a pair of electrode substrates which have been, respectively, subjected to aligning treatment on the facing surfaces thereof, and a nematic liquid crystal layer which is sandwiched between the paired electrode substrates and which has positive dielectric anisotropy and has an angle of twist set, for example, at 240°. More particularly, the rubbing alignment direction (upper rubbing direction), R2, of the aligned layer at the front side of the electrode substrate is twisted by 240° relative to the rubbing alignment direction (lower rubbing direction) R1 at the rear side of the electrode substrate. The polarization axis P2 of the rear polarizer 2 extends in the same direction as the polarization axis P5 of the front polarizer 5. The angle between the lower rubbing direction R1 and the rear polarization axis P2 is set at 45°.

The twist phase plate 4 intervening between the liquid crystal cell 3 and the front polarizer 5 has a structure twisted in a direction opposite to the twisted direction of the liquid crystal layer with an angle of twist set at 240° in this case. The twist phase plate 4 is made of a high molecular weight liquid crystal polymer and serves as a birefringent layer bringing about a birefringent effect on transmitted light. The angle between the optical axis, A1, (lower optical axis) at the rear side of the phase plate 4 and the upper rubbing direction, R2, is set at 90°. The angle between the optical axis, A2, (upper optical axis) and the front polarization axis P5 is set at 45°.

Figure 2:
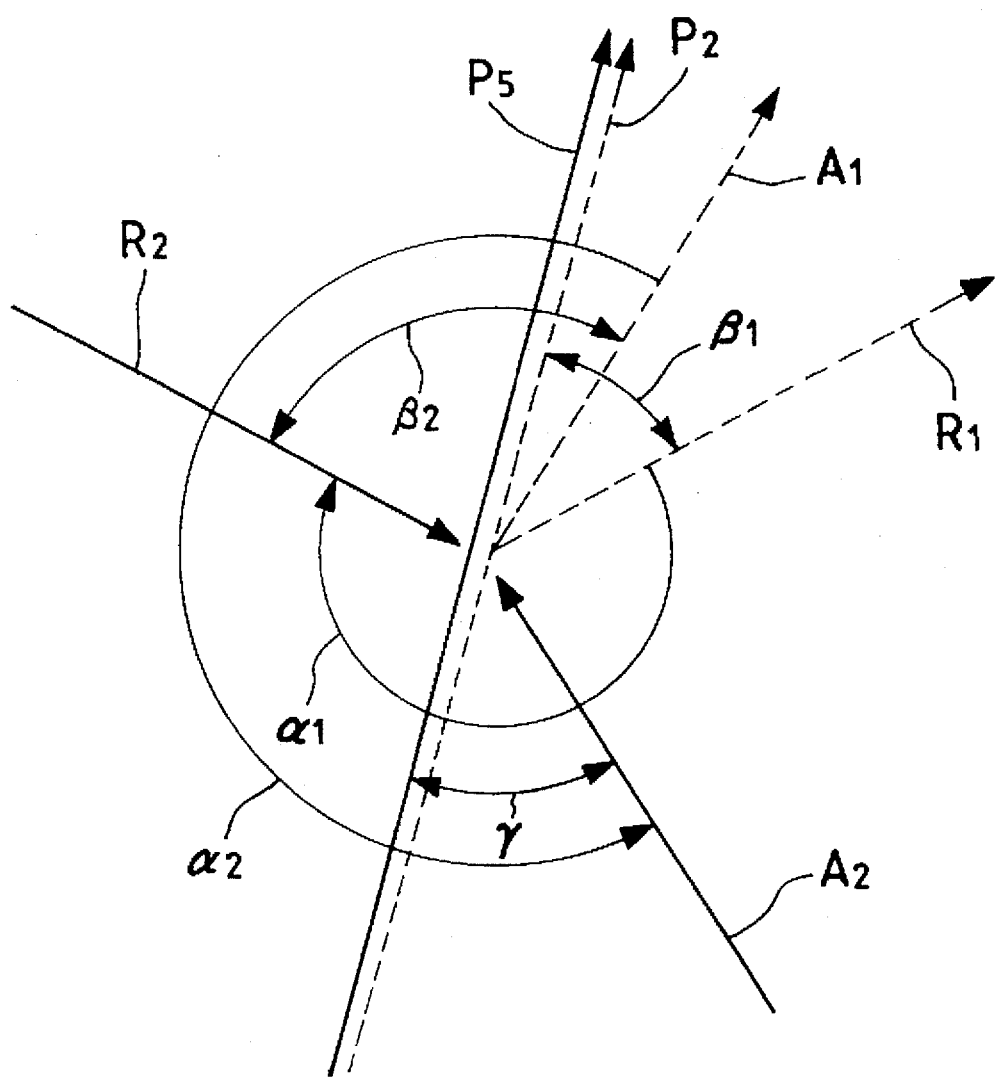
FIG. 2 is an illustrative view showing the relationship of optical axes of the respective elements of the first embodiment.

FIG. 2 shows the relations of the optical axes of the respective elements. In the figure, indicated by $\alpha 1$ is an angle of twist of the liquid crystal cell 3, by $\alpha 2$ is an angle of twist of the twist phase plate 4, by $\beta 1$ is an angle between the lower rubbing direction R1 and the rear polarization axis P2, by $\beta 2$ is an angle between the upper rubbing direction R2 and the lower optical axis A1, and by $\gamma$ is an angle between the upper optical axis A2 and the front polarization axis P5.

In operation, white light reflected at the reflection plate 1 is linearly polarized at the rear polarizer 2 and passed to the liquid crystal cell 3. The light passed through the cell 3 undergoes wavelength dispersion by the birefringent effect. On passage through the phase plate 4, the light again suffers the birefringent effect. Taking this operation into consideration, we have made the following test: the liquid crystal layer of the liquid crystal cell 3 and the twist phase plate 4, which have, respectively, an angle of twist at 240° but wherein the twisting directions are opposite to each other, are provided as being, respectively, changed in thickness; and it has been checked how a display color changes at the time of applying no voltage to the device when the product of $\Delta n \cdot d$, where $\Delta n$ is a refractive index anisotropy and d, is widely changed for both the liquid crystal layer and the twist phase plate 4.

The results are shown in FIG. 3 wherein when the value of $\Delta n \cdot d$ (LC) of the liquid crystal layer and the value of $\Delta n \cdot d$ (PH) of the phase plate 4 are set substantially at the same level within 1.3 to 2.0 µm, the display color becomes white. This reveals that when no voltage is applied, the wavelength dispersion caused by the liquid crystal layer is offset by means of the phase plate 4. As will be set out hereinafter, the liquid crystal layer in voltage-free condition which has a value of $\Delta n \cdot d$ smaller than 1.4 µm is unfavorable for the high-duty purposes. This is because the contrast in voltage-applied condition is degraded.

If a white display color is obtained in voltage-free condition, the display color can be changed into different multiple colors by gradually increasing the voltage applied to the liquid crystal layer to gradually reduce the value of $\Delta n$. More particularly, the variation characteristics of the light transmittance in response to the value of $\Delta n \cdot d$ of the liquid crystal layer differ depending on the difference in wavelength such as of R, G and B. If the applied voltage is controlled to continuously change the value of $\Delta n \cdot d$ (LC), the display color can be changed into different colors relative to the transmittance levels of R, G and B, respectively. Thus, the STN-type liquid crystal display device is colorized, as desired, only by control of a voltage to be applied.

However, for the high-duty purposes wherein a greater number of scanning lines are employed, the time of application of a voltage to one transparent electrode is shorter than in the ordinary device. This means that an effective voltage applied to the liquid crystal layer becomes smaller. Accordingly, if the value of $\Delta n \cdot d$ of the liquid crystal layer in voltage-free condition is less than 1.4 µm, the variation in the value of $\Delta n \cdot d$ becomes too small in voltage-applied condition, resulting in inevitable degradation of contrast. In contrast, the liquid crystal layer in voltage-free conditions is set at 1.4 µm with respect to the value of $\Delta n \cdot d$, the value of $\Delta n \cdot d$ of the liquid crystal layer in voltage-applied condition can be appreciably changed in the case where an effective voltage being applied to the liquid crystal layer is small for realizing the high-duty performance. Thus, the contrast is prevented from degradation, thereby ensuring good color development. According to our experiments, it was possible to drive the device up to a duty ratio of 1/240.

From the foregoing, it will be seen that the colorization of the STN-type liquid crystal display device is possible without formation of any color filters of fine patterns on electrode substrates as in prior art counterparts, on the condition that the value of $\Delta n \cdot d$ (PH) of the twist phase plate 4 and the value of $\Delta n \cdot d$ (LC) of the liquid crystal layer in voltage-free condition are, respectively, set substantially at the same level within a range of 1.4 to 2.0 μm. In addition, good color development is achieved for the high-duty purposes wherein a duty ratio is, for example, 1/240. Hence, a liquid crystal color display device with a high performance and a large picture plane can be manufactured very inexpensively. Any care for the shortage of light quantity is not necessary because color filters are not used. This is advantageous in that back light is unnecessary and the device can be a reflection-type liquid crystal color display device which is light in weight and is beneficial for manufacturing a portable device. Needless to say, if back light is built in instead of the reflection plate 1, the device is usable as a transmission liquid crystal color display device.

Figure 4:
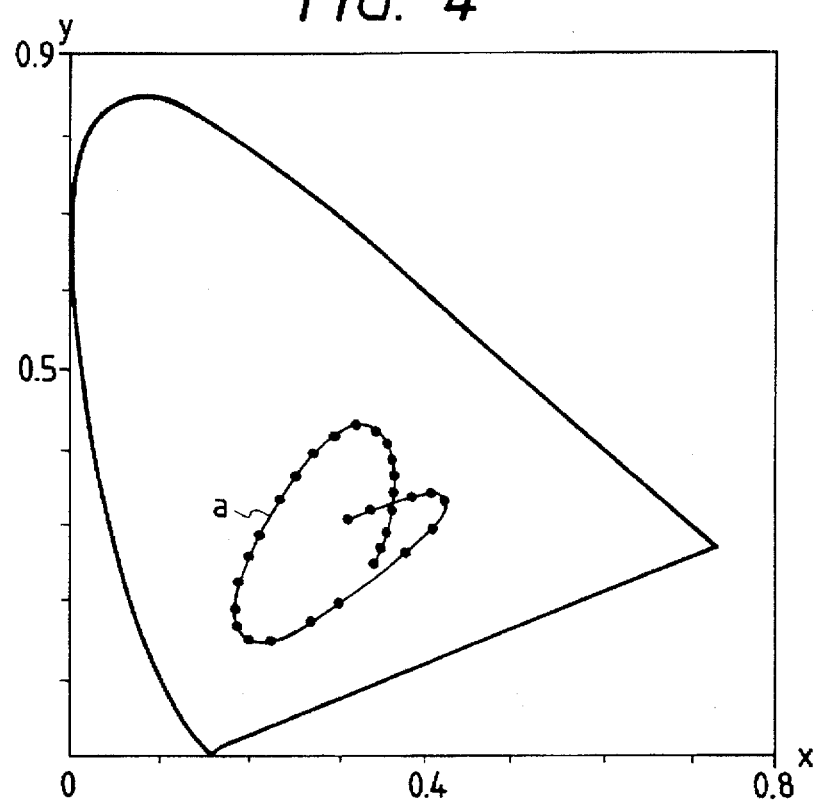
FIG. 4 is an xy chromaticity diagram showing, on chromaticity coordinates, a display color range of the first embodiment.

FIG. 4 shows the xy chromaticity diagram, in which the curve a exhibits a display color range on the chromaticity coordinates when the values of Δn·d (LC) and Δn·d (PH) are, respectively, set at 1.6 μm and 1.7 μm in the device of the first embodiment.

A liquid crystal color display device according to a second embodiment of the invention is briefly described wherein a monoaxially stretched polymer film is used as a phase film in place of the twist phase plate in the first embodiment.

Figure 5:
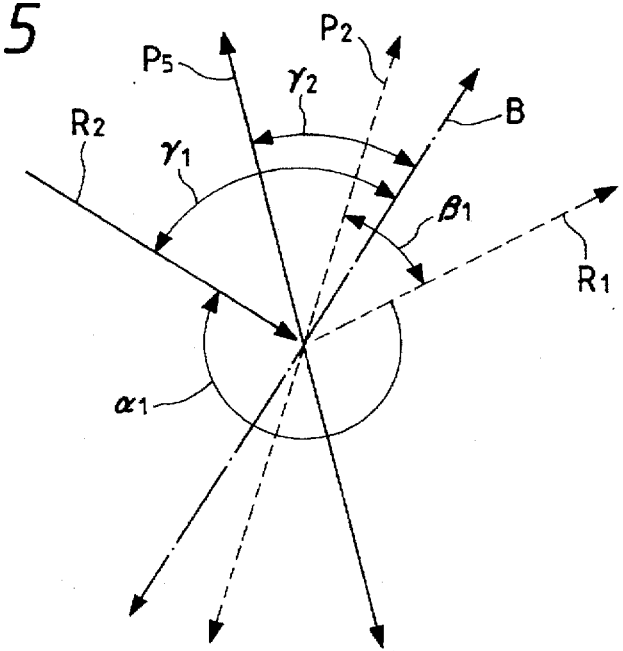
FIG. 5 is an illustrative view showing the relationship of the optical axes of the respective elements of a second embodiment.

More particularly, the device of the second embodiment includes a phase film provided between the liquid crystal cell and the front polarizer. The phase film functions as a birefringent layer which is able to bring about a birefringent effect on transmitted light. As shown in FIG. 5, the angle, γ1, between the optical axis, B, (lag phase axis) of the phase film and the upper rubbing direction, R2, is set at 90°, and the angle, γ2, between the axis, B, and the front polarization axis, P5, is set at 45°. In the case of FIG. 5, the angle of twist, α1, of the liquid crystal cell is set at 240° and the angle, β1, between the lower rubbing direction, R1, and the rear polarization axis, P2, is set at 45° as in FIG. 2.

The monoaxially stretched polymer film serves as a birefringent layer. If the value of Δn·d of the phase film and the value of Δn·d of the liquid crystal layer are properly selected, the colorization of the STN liquid crystal display device is enabled by appropriately controlling a voltage applied to the liquid crystal layer as in the first embodiment. According to our experiments, the results of judgment on "yes" or "no" of display colors developed by changing the values of Δn·d of the phase film and the liquid crystal layer in voltage-free condition are similar to those of FIG. 3.

In both embodiments, the angle of twist of the liquid crystal layer of the liquid crystal cell has been illustrated as being 240°. In view of the results of a number of experiments made by us, the device of the invention is considered to work appropriately within an angle of twist ranging from 180° to 270°. In the second embodiment, if a plurality of phase films whose optical axes are shifted by given angles are superposed, the birefringent effect can be more enhanced. In case where a plurality of phase films are used, the value obtained by totally add the values of Δn·d of individual phase films should be set substantially at the same level as that of the liquid crystal layer within a range of 1.4 to 2.0 μm.

As will be apparent from the foregoing description, a display color obtained in voltage-free condition is close to white color when the values of Δn·d of a birefringent layer such as a twist phase plate and the liquid crystal layer in voltage-free conditions are set substantially at the same level within a range of 1.4 to 2.0 μm, respectively. Proper control of a voltage being applied to the liquid crystal layer leads to a continuous change of the Δn·d value in the liquid crystal layer, resulting in conversion of the display color into different multiple colors as desired. For high-duty purpose, good color development is obtained, for example, at a duty ratio of 1/240. Thus, liquid crystal color display devices of high performance and a large picture plane can be manufactured very inexpensively. In the practice of the invention, color filters are not in used, so that no attention should be paid to the shortage of light quantity, permitting the fabrication of not only transmission display devices, but also reflection-type display devices not requiring back light.

What is claimed is:

1. A liquid crystal color display device which comprises:
   a liquid crystal cell including a pair of electrode substrates, each subjected to aligning treatment on the surface thereof, and a nematic liquid crystal layer which is provided between the pair of electrode substrates and which has positive dielectric anisotropy and an angle of twist set at 180° to 270°;
   a birefringent layer provided in face-to-face relation with said liquid crystal cell and capable of bringing about a birefringent effect on transmitted light; and
   a pair of polarizers sandwiching the liquid crystal cell and the birefringent layer therebetween, wherein said birefringent layer and said liquid crystal layer in voltage-free condition have, respectively, values of Δn·d, wherein Δn represents a refractive index anisotropy and d represents a thickness, the values being substantially at the same level within a range of 1.4 to 2.0 μm, and wherein the value of Δn·d of the liquid crystal cell is continuously varied by controlling a voltage applied thereto.

2. A liquid crystal color display device according to claim 1, wherein said birefringent layer consists of a monoaxially stretched polymer film.

3. A liquid crystal color display device according to claim 1, wherein said birefringent layer consists of a high molecular weight liquid crystal polymer having a structure twisted in a direction opposite to that of said liquid crystal layer.

4. A liquid crystal color display device according to claim 2, wherein an angle between the optical axis of said polymer film and the direction of alignment of liquid crystal molecules caused by said electrode substrate adjacent to said polymer film is set at about 90°.

5. A liquid crystal color display device according to claim 3, wherein an angle between the optical axis of said high molecular weight liquid crystal polymer and the direction of alignment of liquid crystal molecules caused by said electrode substrate adjacent to said high molecular weight liquid crystal polymer is set at about 90°.

* * * * *